United States Patent [19]
Wulker et al.

[11] 3,983,193
[45] Sept. 28, 1976

[54] METHOD OF RETREADING PNEUMATIC TIRES

[75] Inventors: Jan-Eric Lennart Wulker, Traslovslage; Gote Bertil Sivert Bohman, Varberg, both of Sweden

[73] Assignee: DACAPO AB, Varberg, Sweden

[22] Filed: May 1, 1974

[21] Appl. No.: 465,878

[30] Foreign Application Priority Data
  Apr. 10, 1974  Sweden .............................. 7448356
  Nov. 12, 1973  Sweden ............................ 73152639

[52] U.S. Cl. .................................. 264/36; 156/95; 156/394; 264/40.5; 264/89; 264/90; 264/94; 264/102; 264/156; 264/220; 264/326; 425/24; 425/39; 425/DIG. 44
[51] Int. Cl.² .............................. B29H 5/04
[58] Field of Search ................... 264/36, 89, 90, 94, 264/315, 326, 220, 225–227, 40, 101, 102; 425/20, 23, 24, 39, DIG. 44, 124; 156/96, 394 FM, 95

[56] References Cited
UNITED STATES PATENTS

| | | |
|---|---|---|
| 2,014,010 | 9/1935 | Wheatley .............................. 264/36 |
| 2,421,099 | 5/1947 | Vogt ..................................... 156/96 |
| 3,325,326 | 6/1967 | Schelkmann ............. 156/394 FM X |
| 3,337,918 | 8/1967 | Pacciarini ........................ 264/315 X |
| 3,856,601 | 12/1974 | Schelkmann........................ 264/36 X |

*Primary Examiner*—Jan H. Silbaugh
*Attorney, Agent, or Firm*—George W. Price; Martin Smolowitz

[57] ABSTRACT

A method for retreading tires using a resilient mold or matrix ring which is normally smaller than a tire body. On its inner side, this ring has an embossing pattern which applies a tread design to a vulcanizable rubber band previously attached to a tire body. The matrix ring is first expanded and then fitted over the tire body with its vulcanizable band in place. Thereafter, the matrix ring is allowed to contract responsive to its inherent tension. The matrix ring thus attached over the tread band is centered on the body while the tire rotates. This whole unit is then heated to a temperature which converts the tread band into a plastic form and embosses the tread design from the matrix ring onto the tread band, which is vulcanized and bonded to the tire body.

13 Claims, 9 Drawing Figures

3,983,193

METHOD OF RETREADING PNEUMATIC TIRES

This invention relates to the art of applying rubber treads to tires, and more particularly to methods of retreading used pneumatic tire bodies with a fullcircle camelback or tread of new rubber.

Two systems are often used for retreading tires. One system uses a metallic mold to apply a vulcanizable camelback or rubber tread band to a carcass or a tire body while simultaneously embossing and vulcanizing it. The other system begins with a previously embossed and vulcanized tread band which is bonded to the carcass or tire body in a heated pressure vessel.

The first of these systems uses a rigid, toroidal metallic mold or cavity which opens to receive the tire body and then closes to process the retread and design. If the tire body is very carefully placed in a perfect position within the mold, there are no problems. However, if the tire body is not properly placed, the retread will be asymmetrical.

Accordingly, the existing system for embossing and vulcanizing retread camelbacks in rigid metallic molds entails a risk of deformation of the tire. Then the material of the tire is exposed to a substantial stress through pressure and extension during vulcanization in the rigid mold. Therefore, when using this system, it is necessary to have a great number of vulcanizers to accommodate different tire diameters.

The second of the systems mentioned above in a first step uses hydraulic presses with flat metallic molds to vulcanize the tread band and then in a second step uses a heated pressure vessel to bond, by means of a vulcanizable rubber interlayer, the prevulcanized tread band to the tire body. This system eliminates the deformation of the tire; however, it also greatly increases the working operations. The tread band has to be prevulcanized and embossed in special vulcanizers. Thereafter, the engagement surfaces of the tire body and the tread band must be suitably cleaned, roughened, and coated with a rubber adhesive and a vulcanizable rubber interlayer which bonds the tread band to the tire body. This method also has the disadvantage that the retreaded tires have different outside diameters. The thickness of the tread band is the same, but the initial tire body diameter varies, dependent on make and the number of ply or cord layers. If two tires with different diameters are used on the same vehicle, treads tend to wear unequally and rapidly.

Accordingly, an object of the present invention is to provide new and improved tire retreading methods.

Another object is to eliminate expensive and rigid molds heretofore used for retreading tires.

Yet another object is to save costs by eliminating many operations which were heretofore necessary for retreading tires with prevulcanized tread bands such as the use of presses, grinding and trimming machines.

In keeping with an aspect of the invention, these and other objects are accomplished by providing an elastic mold which may be snapped over a camelback tire band previously attached to a tire body. The elastic band may be centered on the tire body while it is turning. Then, the entire unit (elastic mold, camelback, and tire body) may be heat treated to vulcanize the camelback and emboss the tread design thereon.

Reference may be made to the following specification and the accompanying drawings describing and showing a preferred embodiment of the invention, wherein:

FIG. 1 is a cross-sectional view showing one form of a rigid metal mold used by the prior art to retread tires;

FIG. 2 schematically shows another prior art mold in an open position;

Figure 1:
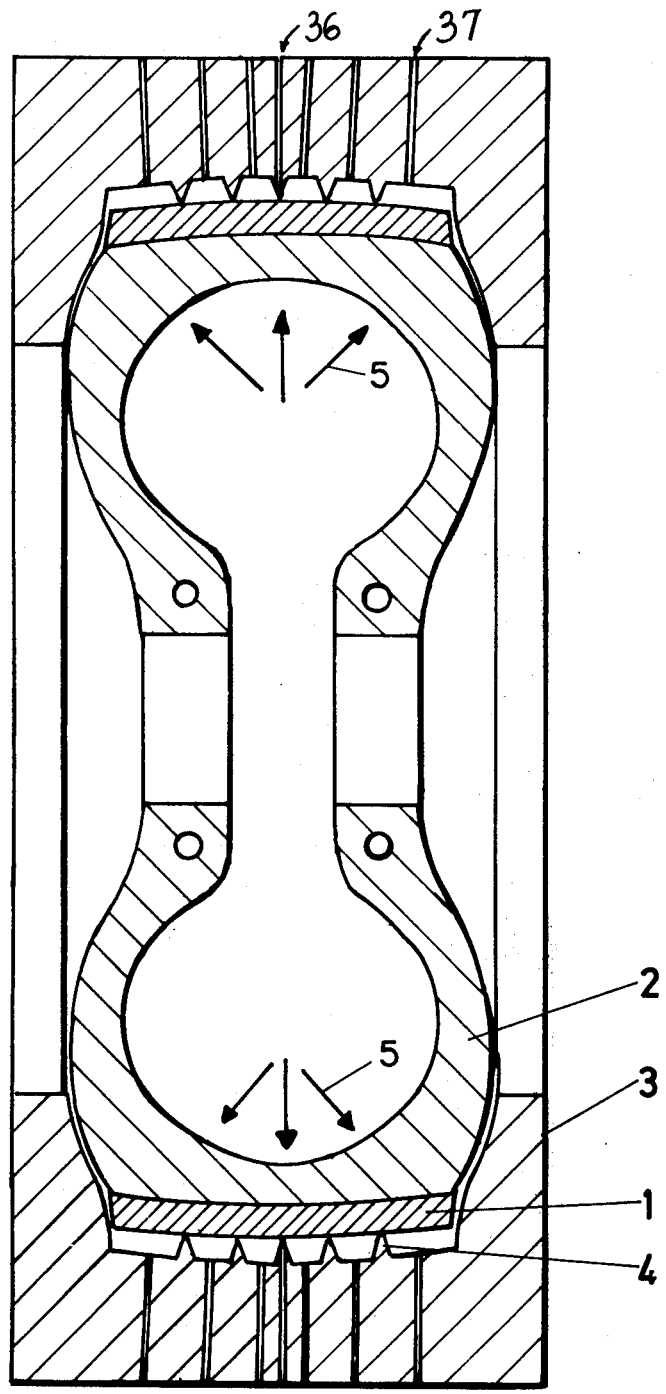
Figure 2:
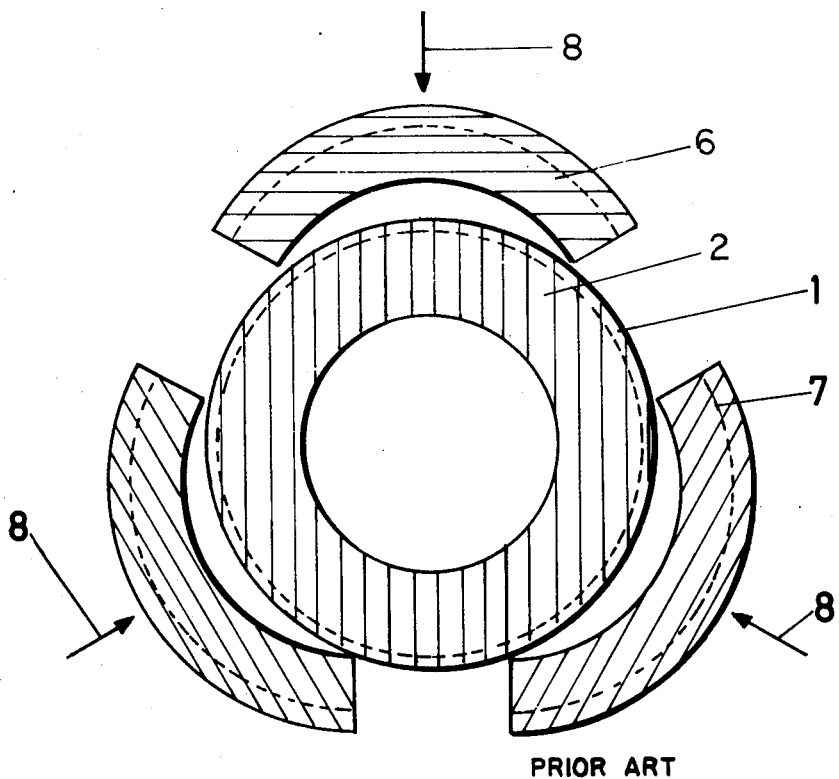
Figure 3:
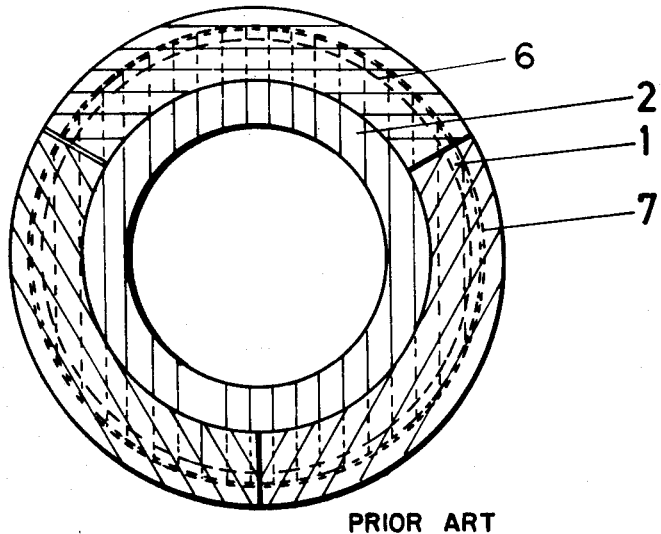
FIG. 3 shows the mold of FIG. 2 in a close position around the tire.
Figure 4:
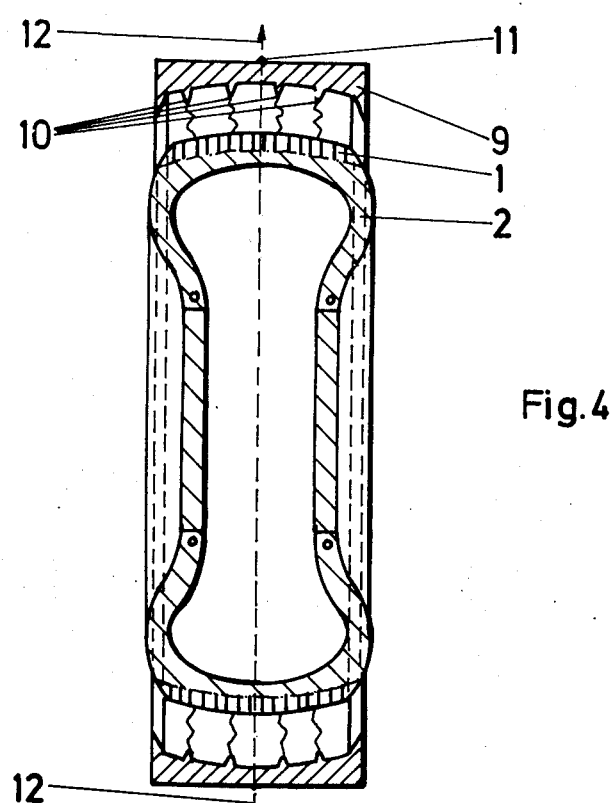
FIG. 4 is a transverse cross-sectional view of the inventive elastic mold constructed according to the invention showing the mold as being stretched around a tire body.
Figure 5:
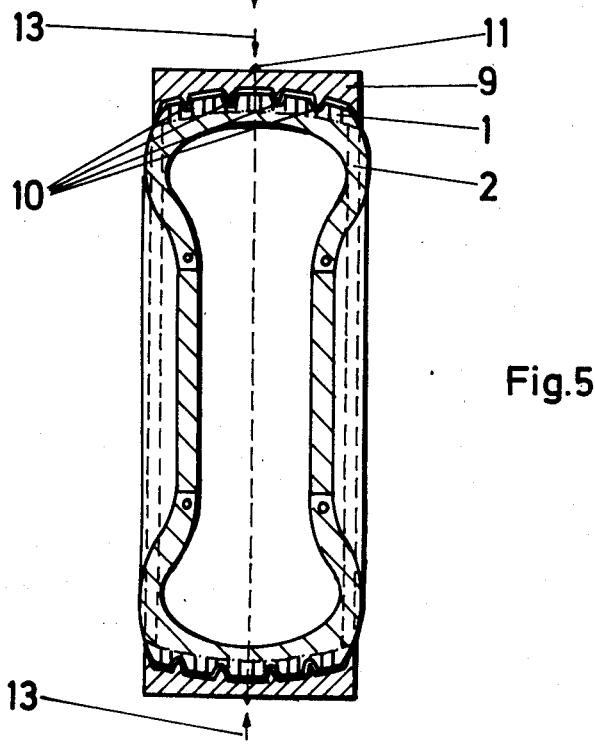
FIG. 5 is a cross-sectional view similar to FIG. 4 showing the elastic mold in its contracted molding position.
Figures 6, 7:
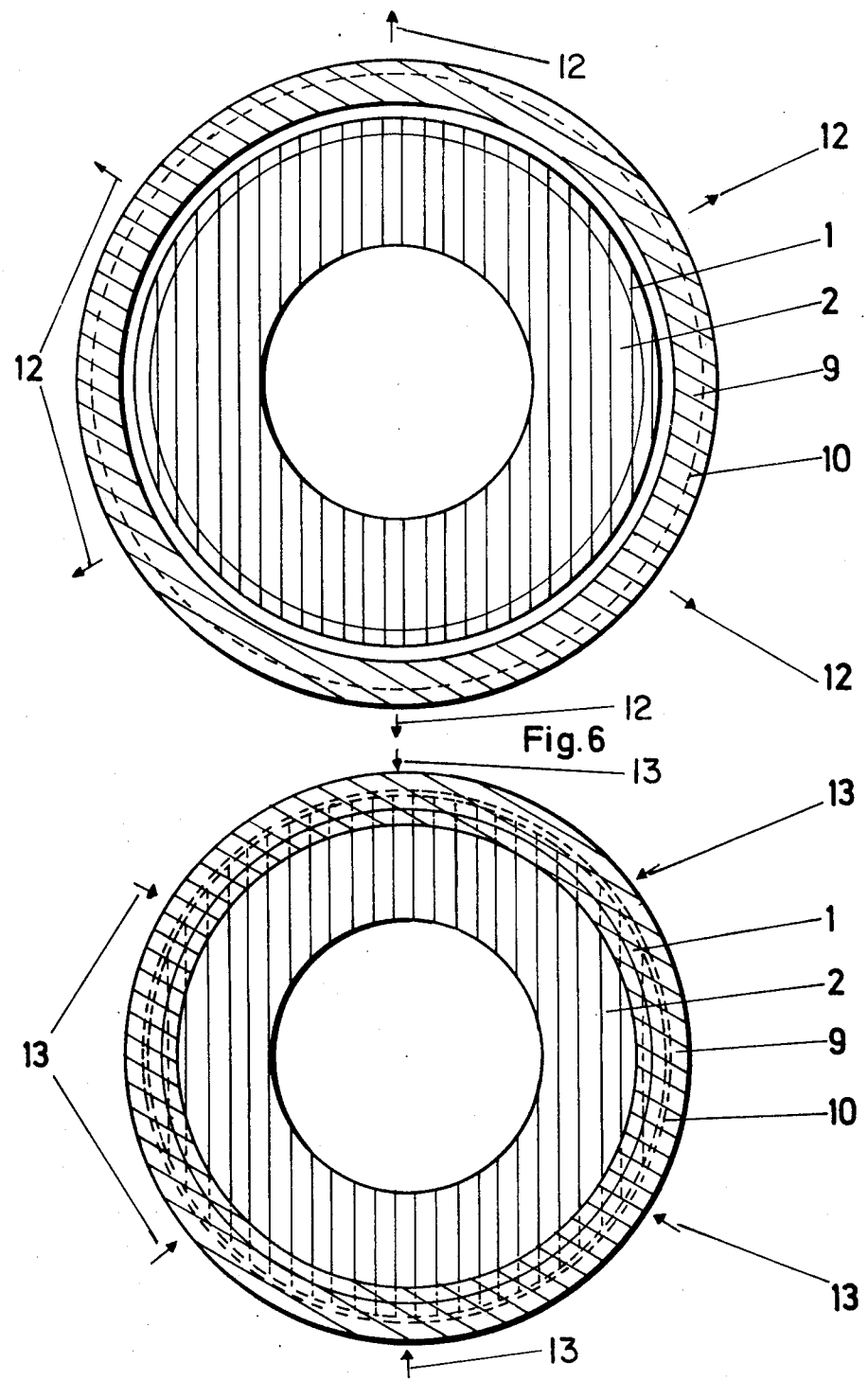
FIG. 6 is a schematic longitudinal cross-sectional view of the stretched elastic mold of FIG. 4.
FIG. 7 is a similar cross-sectional view of the contracted elastic mold of FIG. 5.
Figure 8:
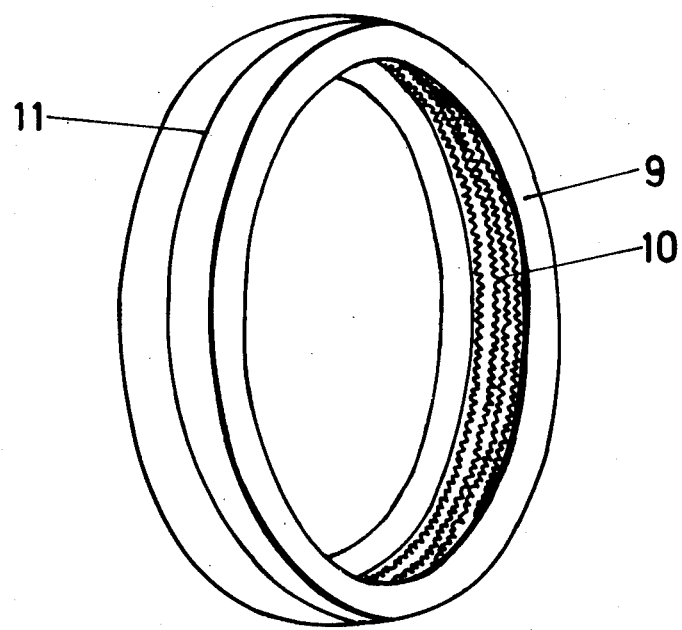
FIG. 8 is a perspective view of the elastic mold matrix ring.

FIGS. 1–3 show two exemplary prior art tire retread methods using metallic molds, each mold with an embossing tread design therein. A tire body 2 which is to be retreaded is clamped inside the mold. In each example, the camelback tread band 1 is shown as having been preliminarily attached to the tire body 2 before its insertion into the mold.

In the prior art embodiment of FIG. 1, mold 3 is longitudinally divided into parts which separate along line 36. The arrows 5 indicte air pressure inside the tire body which forces the tire band 1 with an embossing pressure against tread design die 4. Channels 37 extend from the embossing die area 4 in order to enable entrapped air or gas to escape from the mold during the embossing process.

In the prior art embodiment of FIGS. 2 and 3, the reference character 6 indicates one of three individual mold sections, while the numeral 7 indicates the die in the mold for embossing tread designs, and numeral 8 represents force applying means for opening and closing the mold sections.

According to the prior art (FIGS. 1–3), a tire body 2 is preliminarily processed by having its previous tread surface cleaned and roughened. Then, the camelback tread band 1 is attached to the tire and the combination of tire and tread is placed in the longitudinally opened mold 3 (FIG. 1), which is thereafter closed. In the tire body 2, air pressure 5 presses the camelback tread band 1, attached to the tire, against the heated mold 3, which embosses the tread design and simultaneously vulcanizes the tread band 1. Thereafter, the mold 3 is opened and the retreaded tire 2 is removed. FIGS. 2 and 3, the tire body 2, and camelback tread band 1 are preliminarily processed as described above in connection with FIG. 1. Then, the three radially divisable mold sections 6 are opened. Then tire 2 and tread band 1 are placed between the open mold sections, as shown in FIG. 2. Next the mold sections are pressed by a force applying means 8 so that embossing profiles 7 are pressed against vulcanizable tread band 1 and the tire body 2 which is filled with air pressure.

According to the invention (FIGS. 4–8), an elastic matrix or embossing ring 9 is used during the retread vulcanization procedures. This ring 9 must be sufficiently resilient in an outwardly radial direction and it must withstand a vulcanizing heat without deforming. Therefore, a suitable high temperature elastic rubber or similar material is used to make the ring mold 9. In one embodiment actually used, the rubber in matrix ring 9 vulcanizes at about 150°–180° C., and was otherwise resistant to heat.

The ring mold 9 has on its inner side an embossing tread pattern 10. When expanded (FIG. 4), the inner diameter of ring 9 is larger than the outer diameter of the tire body 2 with the vulcanizable camelback tread band 1 attached thereto. On its outer side, equatorial to the tread, the matrix ring 9 has a fullcircle projection bead or circumferential fin 11, which serves as a centering index when the ring is placed over the tire body, just before the vulcanization step. Preferably, the tire is rotated while the bead or fin 11 is inspected or measured for trueness of its position.

In order to make the matrix ring or mold 9, a new or unused retread tire can be used as a form. First, a layer of any suitable high temperature vulcanizable rubber is placed over the patterned tread surface of the tire form, which is preferably treated before with an antiadhesive agent. Thereafter, this layer is vulcanized under both pressure and suitable high temperature. Thus, the resultant rubber layer 9 is internally embossed with a negative contour of the tread pattern on the tire which is used as a form. The best results of creating said negative contour are obtained when the tire with unvulcanized rubber layer is inserted into a flexible tubular rubber envelope which covers the tire on its entire surface. The air from the open space between tire body, rubber layer and tubular envelope is evacuated by suction and the assembly is exposed to heat and pressure in a chamber. Preferably a tubular envelope as is described in U.S. Pat. No. 2,966,936 is used for manufacturing the matrix ring 9. Other methods of using envelopes as known from the art of retreading may be utilized as well.

Any air entrapped between the rubber layer and the form tire is evacuated through holes which are made in the body of the tire form at the deepest parts of the tread pattern. These holes are somewhat similar to holes 37 in FIG. 1 except that they extend through the body of tire 2 instead of through mold 3.

When retreading a tire body 2, a smooth and unvulcanized camelback layer of rubber 1 is applied over a conventionally prepared smooth tread area of the tire body 2. This layer 1 has a low temperature (such as 100° C.) vulcanizing characteristic as compared to the characteristic of matrix ring 9. Also, the thickness of the camelback is selected relative to the diameter of the prepared tire body so that the outside diameter of the retreaded tires will be uniform and standard.

The matrix ring 9 is treated with an antiadhesive agent and stretched (FIGS. 4 and 6), as indicated by arrows 12. The tire body 2, with the preliminarily applied camelback layer 1, is then placed within the matrix ring 9 which contracts over the tire body, owing to its own resilience, as indicated by arrows 13. By means of a fullcircle equatorial projection head or fin 11, the matrix ring 9 may be centered on the tire body 2 while it is rotating on any suitable supporting mechanism (not shown) and while the ring 9 is contracting completely, responsive to its own inherent tension. In any event, it is fully contracted by the time that the centering step is completed. Thus, the matrix ring 9 is now being pressed under force 13 against the tire body and its attached camelback layer 1 of rubber.

The unit comprising the tire body 2, the rubber camelback layer 1, and the matrix ring 9 is thereafter placed in a heated tank, using either gas or liquid as a heat transfer medium. In the above cited example of camelback rubber which vulcanizes at a low temperature—such as 100° C.—the heated tank temperature will likely be about 100° C.

While so heated, the rubber layer 1 is changed from a low plastic condition into a high plastic condition. In this highly plastic state during the vulcanization process, the inherent tension of the matrix ring 9 transfers and embosses the profile of its tread pattern 10 into the rubber layer 1. The elastic pressure 13 of the matrix ring 9 is directed radially toward the tread area of the enclosed tire body to accomplish the corresponding embossing process. Preferably, the plastic condition of the rubber camelback layer 1 is maintained, as long as possible, through a slow temperature increase of suitable rubber mixtures, so that the embossing pressure exerted by the matrix ring 9 will not be too high, and so that the profiles of the pattern 10 on the matrix ring which are relatively soft, are not deformed. Also, suitable holes (similar to holes 37) may be formed in the matrix ring 9 to enable an escape of entrapped air.

The embossing part of the retread operation is concluded at the beginning of the vulcanization process. Later, because of the vulcanization, the rubber layer changes from its plastic condition to a stable elastic condition. After the completion of the vulcanization process, the pattern of the tread has become stable and finished. The matrix ring 9 is then stretched and removed from the tire, which is now retreaded.

When required, the embossing pressure of the matrix ring may be augmented by any suitable means for applying additional pressures, which are directed radially against the matrix ring.

Figure 9:
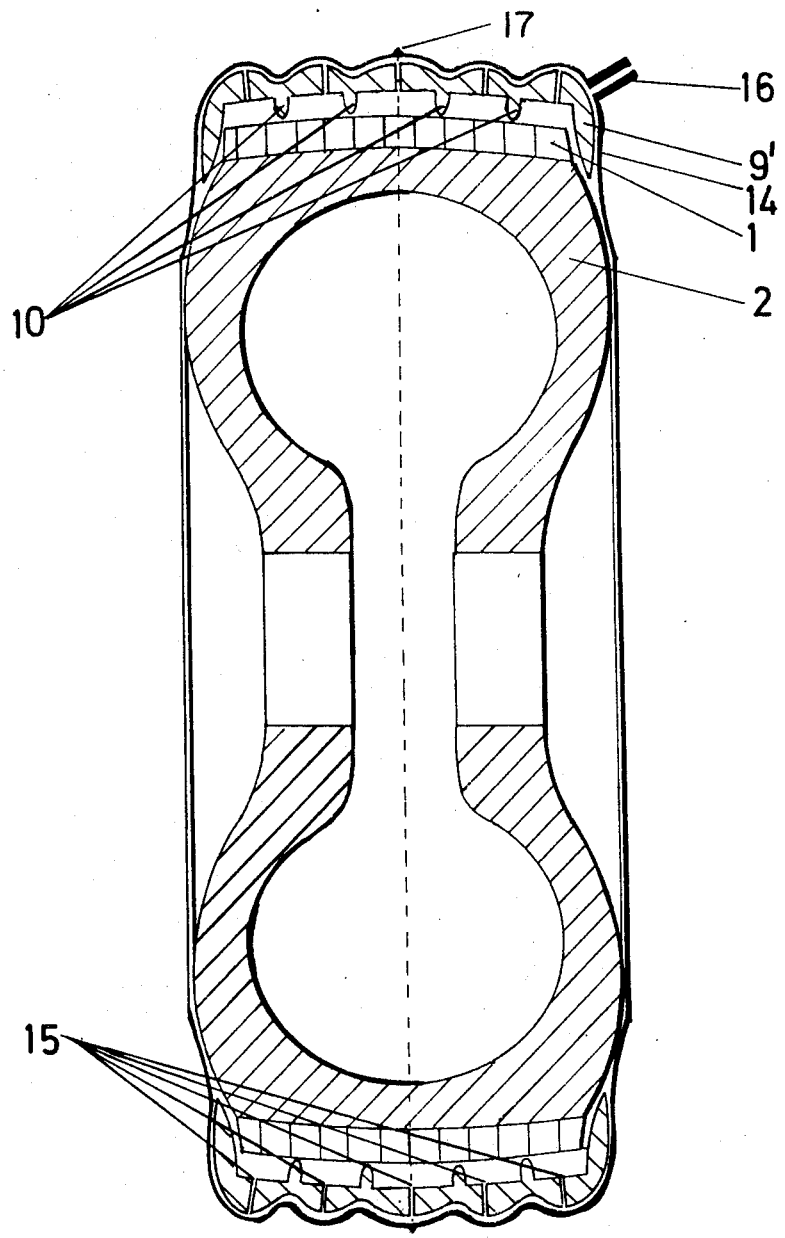
FIG. 9 is a cross-sectional view similar to FIG. 5 showing the matrix ring with a superimposed rubber diaphragm.

Preferably pressure of a fluid or gaseous vulcanizing medium is used in connection with a superimposed rubber diaphragm to apply an auxiliary embossing pressure to the assembly. FIG. 9 shows how this method is carried out into practice. The tire 2 with unvulcanized rubber layer 1 and matrix ring 9' is covered with a resilient rubber diaphragm 14. This diaphragm also covers under sealing a surface portion of the tire which extends beyond the lateral edges of the matrix ring 9'.

The matrix ring 9' is provided with radially extending holes 15 and the rubber diaphragm with a suction valve 16. By means of a suction pump, connected to this valve, entrapped air can be evacuated from the spaces between the inner side of the matrix ring 9' and the outer side of the tread band 1 and between the outer side of the matrix ring 9' and the inner side of the rubber diaphragm 14. Those surfaces of the matrix ring 9; which are directed radially outwards can be roughened or suitably patterned to allow the passage of air from the holes 15 to the suction valve 16.

In order to facilitate the application of the matrix ring 9' and the rubber diaphragm 14 onto the tire body 2 provided with the tread band 1 and have the first two elements position controlled in relation to each other they are preferably bonded together at the lateral edges of the matrix ring 9'. The rubber diaphragm 14 thereby will accompany the matrix ring 9' when this is expanded and contracted.

In order to assist, in this case, in the centering of the matrix pattern 10 in relation to the tire body 2 the rubber diaphragm 14, and not as before the matrix ring 9, is provided with a fullcircle projection bead or circumferential fin 17.

The entire assembly including the tire body 2 with tread band 1, matrix ring 9' and rubber diaphragm 14 is introduced into a pressure vessel, to which a then heated fluid or gaseous vulcanizing medium is supplied under proper pressure, thereby generating the additional pressure onto the rubber diaphragm 14 and thus onto the matrix ring 9'. During this vulcanizing process, pressure is increased slowly.

In order to achieve a true print of the pattern 10 onto the rubber layer 1, when using such an additional pressure, the matrix ring 9' must be designed as is shown in FIG. 9. There the thickness of the matrix ring 9', seen transversely, varies such that it is largest in the middle between two neighboring projections of the pattern 10 and is decreased from the middle in both directions towards these projections. Such a shape eliminates the risks that the print of the tread band 2 of the vulcanized tire will be concave between these two projections. Through the design mentioned above the counter force acted by the matrix ring will be the largest in the middle between the projections, where the largest bending moment is generated by the additional pressure. The bending of the matrix material between the projections thereby will be minimized, which is an absolute condition for a true print.

When using an additional pressure as is described in connection with FIG. 9 it is possible to dimension the matrix ring to be thinner, as it is not necessary for the ring to have such a large inherent tension. The air entrapped between the tire band 1 and the matrix ring 9' is evacuated to insure a good duplication or printing of the tread design. If the entrapped air were allowed to remain, it would be compressed to deface the tread and thereby result in a bad imprinting of it into the embossed tire band.

Those skilled in the art will readily perceive modifications which fall within the scope and the spirit of the invention. Therefore, the appended claims are to be construed broadly enough to cover all equivalent structures.

We claim:
1. A method of treading tires in which a vulcanizable camelback tread band is placed on the tread receiving surface of a tire body, said band being made of a material which has a predetermined vulcanizing temperature and which becomes plastic during vulcanization thereof, and in which a peripherally continuous, stretchable, matrix ring mold having an internal, embossing, negative tread pattern is contacted with said band to form said tread pattern thereon, said tread pattern, when said mold is unstretched, having a predetermined normal inner diameter and said mold being made of an elastic material which substantially maintains its elasticity and physical form at least at temperatures up to said vulcanizing temperature, said method comprising the steps of:
   a. placing said camelback tread band on and in contact with the tread receiving surface of a tire body, said tread band having a radial thickness such that the outer diameter thereof when placed on said tire body is greater than said normal inner diameter of said tread pattern;
   b. increasing said inner diameter of said tread pattern to a size at least equal to said outer diameter of said band by stretching and expanding said mold and placing said mold over said tread band on said tire body, the elasticity of said elastic material being sufficient to permit said stretching of said mold without exceeding the elastic limit thereof, whereby said tread pattern is urged by elastic tension to contract until it reassumes said normal inner diameter after the stretching force thereon is terminated;
   c. allowing the expanded matrix ring mold to contract, responsive to said elastic tension, at least until said pattern contacts the exterior surface of said tread band on the tire body; and
   d. heating the matrix ring mold, tire body and tread band to a temperature which converts the tread band into a plastic form and thereby permits said mold to further contract and emboss the tread pattern of the matrix ring mold onto the tread band, and which vulcanizes the tread band onto the tire body.

2. The method as set forth in claim 1, wherein said mold has an exterior, equatorial bead thereon and wherein step (c) includes the further step of centering said mold with respect to said tire body by rotating said tire body with said mold thereon and displacing said mold with respect to said tire body while visually inspecting said bead.

3. The method as set forth in claim 1, further comprising the preliminary steps of making said mold by:
   a. forming a band of vulcanizable material on a tire form having a tread thereon of the desired tread pattern;
   b. heating said last-mentioned tire form and said last-mentioned band under pressure and at a temperature sufficient to vulcanize said last-mentioned band with said tread pattern therein; and
   c. removing said last-mentioned band after vulcanization thereof and using said so-formed and vulcanized last-mentioned band as said ring mold in the subsequent steps of claim 1.

4. The method as set forth in claim 3, further comprising forming holes in said tire form extending from the tread thereof to the interior of said tire form prior to forming said last-mentioned band thereon to permit the escape of air from said last-mentioned band during the vulcanization thereof.

5. The method as set forth in claim 3, wherein said vulcanizable material used to form said band on said tire form has a first characteristic temperature at which vulcanizing occurs and said camelback tread band has a second temperature at which vulcanizing occurs, said first characteristic temperature being higher than said second characteristic temperature.

6. The method as set forth in claim 5, wherein said second characteristic temperature is approximately two-thirds of said first characteristic temperature.

7. The method as set forth in claim 1, wherein step (a) comprises the further step of selecting and placing on the tire body a camelback tread band having a radial thickness relative to the diameter of said tire body which causes the combination of said camelbck tread band and tire body to have the standard diameter for said tire body.

8. The method as set forth in claim 1, wherein said tread pattern comprises projections which are elastically deformable by said elastic tension when said tread pattern is in contact with said camelback tread band and wherein said heating of said mold, tire body and camelback tread band is controlled in time and rate of temperature increase so that said tread band remains in its plastic condition for a time sufficient to permit embossing of said tread band without deformation of said projections.

9. The method as set forth in claim 1, further comprising, prior to vulcanizing said tread band, providing a stretched, elastic, peripherally continuous, rubber diaphragm around and in contact with said ring mold, the internal surface of said diaphragm in contact with said ring mold having a normal, unstretched, diameter which is less than the diameter of the surface of said ring mold after placement of the latter on said tread band whereby said diaphragm applies a force to said mold urging the latter toward said tread band, and during the heating of said mold, said tire body and said tread band, applying a fluid medium under pressure thereto.

10. The method as set forth in claim 9, wherein said diaphragm has portions extending along the axially opposite sides of said ring mold and further comprising the step of bonding said portions to said sides of said ring mold prior to the placing of said ring mold over said tread band.

11. The method as set forth in claim 9, wherein said diaphragm is secured in substantially air-tight relation to said ring mold but is disposed so as to leave the interior of said tire body exposed to said fluid medium and wherein said mold has radially extending holes which extend from the radially inner surface of said mold to the radially outer surface thereof and further comprising the step of evacuating the air from between said diaphragm and said ring mold after the latter is placed over said tread band and maintaining both the interior of said tire body and the exterior of said diaphragm under the pressure of said fluid medium.

12. The method as set forth in claim 9, wherein said tread pattern on said ring mold comprises projections extending radially inwardly and spaced axially of said mold and further comprising forming said mold with axially spaced portions radially outwardly of said projections with a radial thickness which is less than the radial thickness of said mold between said portions whereby bending of said ring mold intermediate said projections is minimized during the heating of said tread band.

13. A method as set forth in claim 1, wherein at least one of said mold and said tread band is treated with an anti-adhesive agent prior to placing said mold over said tread band.

* * * * *

UNITED STATES PATENT AND TRADEMARK OFFICE
CERTIFICATE OF CORRECTION

PATENT NO. : 3,983,193
DATED : September 28, 1976
INVENTOR(S) : Jan-Eric Lennart Wulker et al It is certified that error appears in the above-identified patent and that said Letters Patent are hereby corrected as shown below:

Identifier [30] : "7448356" should read --7404835--

: "73152639" should read --7315263--

Signed and Sealed this

Twenty-third Day of January 1979

[SEAL]

Attest:

RUTH C. MASON
Attesting Officer

DONALD W. BANNER
Commissioner of Patents and Trademarks